(12) United States Patent
Franklin et al.

(10) Patent No.: US 12,235,847 B2
(45) Date of Patent: Feb. 25, 2025

(54) ENTITY ID LINEAGE PERSISTENCE AND CROSS-TENANT DURABILITY

(71) Applicant: Reltio, Inc., Redwood Shores, CA (US)

(72) Inventors: Martin Franklin, San Diego, CA (US); Manish Sood, Seattle, WA (US); Dmitry Blinov, Redwood Shores, CA (US); Mike Frasca, Durham, NC (US); Mohammad Naveed, Woodland, CA (US)

(73) Assignee: Reltio, Inc., Redwood Shores, CA (US)

( * ) Notice: Subject to any disclaimer, the term of this patent is extended or adjusted under 35 U.S.C. 154(b) by 0 days.

(21) Appl. No.: 18/193,334

(22) Filed: Mar. 30, 2023

(65) Prior Publication Data

US 2023/0315737 A1 Oct. 5, 2023

Related U.S. Application Data

(60) Provisional application No. 63/325,398, filed on Mar. 30, 2022.

(51) Int. Cl.
*G06F 16/24* (2019.01)
*G06F 16/21* (2019.01)
*G06F 16/23* (2019.01)
*G06F 16/2455* (2019.01)

(52) U.S. Cl.
CPC ........ *G06F 16/24556* (2019.01); *G06F 16/21* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 2001/0051948 A1* | 12/2001 | Srinivasan | G06F 16/284 707/999.102 |
| 2003/0037024 A1* | 2/2003 | Fitzpatrick | G06F 16/2365 |
| 2017/0199903 A1* | 7/2017 | Floyd | G06F 16/2365 |
| 2019/0384847 A1* | 12/2019 | Bobbala | G06F 16/2282 |
| 2022/0138280 A1* | 5/2022 | Riggs | G06F 16/24578 707/737 |
| 2023/0229652 A1* | 7/2023 | Plush | H04L 63/1408 707/691 |
| 2023/0289278 A1* | 9/2023 | Badrinath | G06F 16/21 |

* cited by examiner

*Primary Examiner* — Hosain T Alam
*Assistant Examiner* — Cao D Vuong
(74) *Attorney, Agent, or Firm* — Ahmann Kloke LLP

(57) ABSTRACT

Among other techniques, techniques for dynamic survivorship, cross-tenant matching, and lineage entity identifier (EID) promotion are described. A system utilizing these techniques can include an industry-agnostic datastore, an industry-focused datastore, a tenant datastore, a new dataset datastore, a new dataset onboarding engine, an EID assignment engine, an object registration engine, a primary EID selection engine, a matching engine, a merging engine, a survivorship engine, a cross-tenant matching engine, and a lineage EID promotion engine. A method utilizing these techniques can include new dataset onboarding, EID assignment, object registration, primary EID selection, matching, merging, survivorship, cross-tenant matching, and lineage EID promotion.

10 Claims, 2 Drawing Sheets

ENTITY ID LINEAGE PERSISTENCE AND CROSS-TENANT DURABILITY

CROSS-REFERENCE TO RELATED APPLICATIONS

The present application claims priority to U.S. patent application Ser. No. 63/325,398 entitled "METADATA CONFIGURATION BASED ON A N-LAYER MODEL," filed Mar. 30, 2022, which is incorporated by reference herein.

BACKGROUND

As used in Master Data Management (MDM) and Data Quality Management (DQM), a "golden record" is a representation of a real world entity. In a specific implementation, a "golden record" has multiple views of any object depending on a viewer's account and survivorship rules associated therewith. It is understood that changing golden records in a datastore is an $O(n)$, or linear process. Big O notation, or asymptotic notation, is a mathematical notation that describes the limiting behavior of a function when the argument tends towards a particular value or infinity. Asymptotic notation characterizes functions according to their growth rates. In a big data context, it would normally be necessary to shut down a system to integrate a new data set (e.g., a third party data set) into an existing one.

SUMMARY

By utilizing dynamic survivorship, which is equivalent to a golden record but is done on the fly using survivorship rules associated with accounts, the linear process becomes an $O(1)$, or constant process. Changing survivorship rules across a data set using dynamic survivorship is a dramatic improvement when dealing with "big data," making the practically impossible possible. Dynamic survivorship rules facilitate immediate data integration when adding a large data set because you do not have to take the time to shut the system down for the integration process.

DETAILED DESCRIPTION

Figure 1:
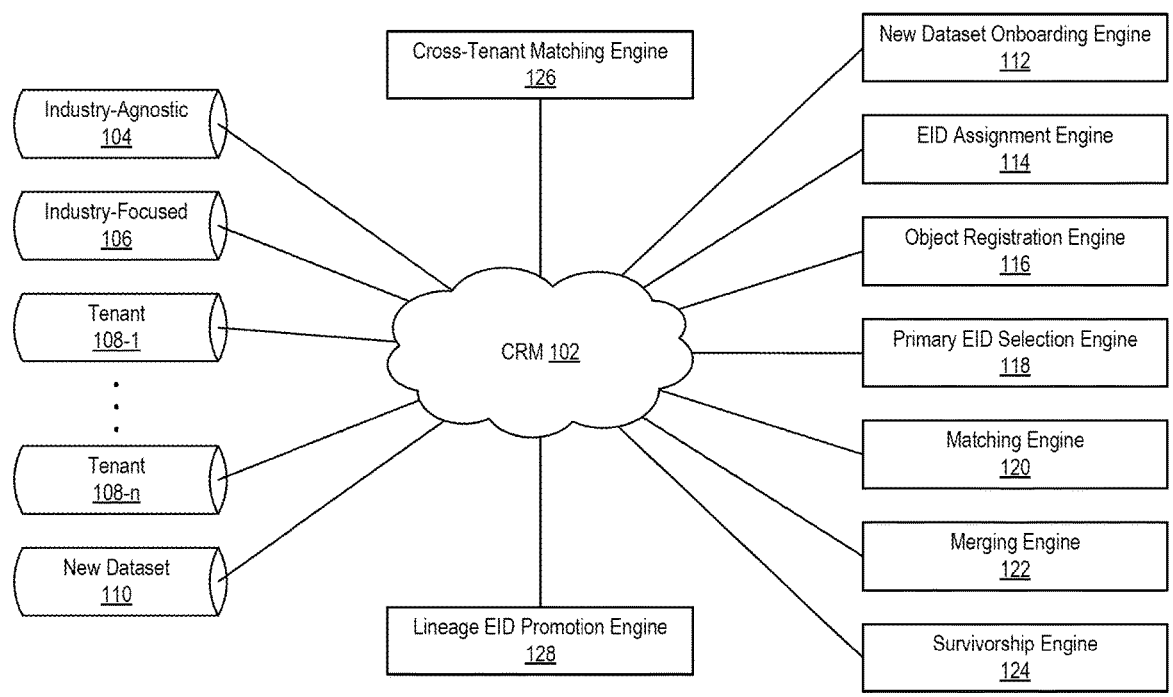
FIG. 1 is a diagram of an example of a cross-tenant durable entity identifier (EID) lineage-persistent relational database management system (RDBMS).

FIG. 1 is a diagram 100 of an example of a cross-tenant durable entity identifier (EID) lineage-persistent relational database management system (RDBMS). While referred to throughout this paper as the cross-tenant durable EID lineage-persistent RDBMS, it should be noted the cross-tenant durability and the EID lineage persistence are separate techniques that could implemented in separate applicable technologies. The diagram 100 includes a computer readable medium (CRM) 102, an industry-agnostic datastore 104 coupled to the CRM 102, an industry-focused datastore 106 (optional) coupled to the CRM 102, a tenant datastore 108-1 to a tenant datastore 108-$n$ (collectively, the tenant datastores 108) coupled to the CRM 102, a new dataset datastore 110 coupled to the CRM 102, a new dataset onboarding engine 112 coupled to the CRM 102, an EID assignment engine 114 coupled to the CRM 102, an object registration engine 116 coupled to the CRM 102, a primary EID selection engine 118 coupled to the CRM 102, a matching engine 120 coupled to the CRM 102, a merging engine 122 coupled to the CRM, a survivorship engine 124 coupled to the CRM 102, a cross-tenant matching engine 126 coupled to the CRM 102, and a lineage EID promotion engine 128 coupled to the CRM 102.

In a specific implementation, the cross-tenant durable EID lineage-persistent RDBMS has an n-Layer architecture. For illustrative simplicity, a 3-Layer model is used for the examples provided in this paper, with the industry-agnostic datastore 104 in Layer 1 (L1), the industry-focused datastore 106 in Layer 2 (L2), and the tenant datastores 108 in Layer 3 (L3).

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Referring once again to the example of FIG. 1, the industry-agnostic datastore 104 is a datastore that is intended to represent an L1 compilation of big data comprising a plurality of objects with a respective plurality of EIDs. As used in the RDBMS industry, big data can refer to data sets that are too large or complex to be dealt with by traditional data-processing application software. Data with many entries (rows) offer greater statistical power, while data with higher complexity (more attributes or columns) may lead to a higher false discovery rate. Though used sometimes loosely partly because of a lack of formal definition, the interpretation that can be used to describe big data is the one associated with large body of information that would be incomprehensible when used only in smaller amounts.

It may be noted that in a specific implementation, the industry-agnostic datastore 104 includes three general data types, entity, relationship, and interaction. For the sake of convenience, the term EID is used to describe the ID of objects of any of these data types, regardless of whether it would be characterized as an "entity," a "relationship," or an "interaction." For the purpose of this example, it is assumed the industry-agnostic datastore 104 is populated with objects incorporated in a manner similar to that described below for a new dataset.

For this example, assume L1 is the root level layer that contains industry-agnostic objects defined and controlled by a cross-tenant durable EID lineage-persistent RDBMS agent, whether human or artificial, on behalf of an organization that provides tenants in a multitenancy environment. For example, such an agent could be a human agent of a product management team or an artificial agent acting on behalf of the product management team.

Multitenancy is an architecture in which a software instance runs on a server and serves multiple tenants; the software and the hardware on which the server runs can be referred to as a tenant configuration and maintenance engine or "multitenancy engine" (not shown in FIG. 1). A tenant is a group of users who share a common access with specific privileges to a software instance. The multitenancy engine provides each tenant of the multitenant system a dedicated share of the instance, including its data, configuration, user management, tenant individual functionality, and non-functional properties.

In a specific implementation, there is only one L1 layer, and its role is to define industry-agnostic objects that can be inherited by higher layers in the architecture. The industry-agnostic datastore 104 includes entities such as Party (an abstract type) and Location. In a specific implementation, a fundamental (L1) relationship type called "Has Address" links the Party type to the Location type. The Party entity type is defined with a collection of attributes in it. Advantageously, objects in the L1 layer can be enhanced, potentially affecting all customers. For example, if an additional attribute was added into the "Has Address" relationship type, it would be available for accessible by customers. As another example, L1 can extend the Party type to Organization and Individual both of which inherit from Party, both of which are non-abstract types, and both of which add additional attributes specific to their type of business function.

The industry-focused datastore 106 is a datastore that is intended to represent L2. For this example, assume L2 is a middle layer that contains industry-specific objects defined and controlled by a cross-tenant durable EID lineage-persistent RDBMS agent, whether human or artificial, on behalf of an organization that provides tenants in a multitenancy environment. In an alternative, the industry-focused datastore 106 is controlled by someone else. The industry-focused datastore 106 can be considered optional because, in at least one specific implementation, it can be removed from between L1 and L3, yielding a 2-Layer architecture, or at least n-1.

In a specific implementation, the industry-agnostic objects defined at L1 are inherited by and utilized at L2, which includes industry-specific layers. Life Sciences is a good example of an L2 container. It inherits the Organization entity type from L1 and extends it to the Health Care Organization (HCO) type needed in Life Sciences. As such, the HCO type enjoys all of the attribution and other properties of the Organization type, but defines additional attributes and properties needed by an HCO.

The tenant datastores 108 are datastores that are intended to represent L3. For this example, assume L3 is a top layer accessible by customers of the cross-tenant durable EID lineage-persistent RDBMS; it can be characterized as part of each customer's tenant. In a specific implementation, L3 inherits from L2, the industry-focused layer. L3 refers to an L2 container and inherits all objects from the L2 container, but as previously mentioned, it can stand alone, in which case L2 is at least constructively removed.

In a specific implementation, the L3 layer is a JSON file that is a part of the customer's tenant and which, in at least some implementations, can be edited and applied to the tenant by an agent of the tenant (or "customer"). It is easily retrieved from the tenant, edited and applied back to the tenant using Configuration API.

In a specific implementation, each Layer of a 3-Layer metadata configuration engine is represented by a JSON file. The consolidated configuration resulting from the inheritance between the three layers can be referred to as "tenant configuration" or "metadata configuration." As such, a 3-Layer metadata configuration engine responsible for the configuration can be referred to as a "tenant configuration engine" or "metadata configuration engine." For example, the tenant configuration engine can consolidate simple, nested, and reference attributes from all related layers. The four manifestations of attribute type described for illustrative purposes in this paper are Simple, Nested, Reference, and Analytic. Values described in the higher layer overrides the values from the lower layers. The number of layers does not affect the inheritance. Objects can be defined in any layer.

The new dataset datastore 110 is intended to represent objects that have not yet been assigned an EID (at least not one that is specific to the cross-tenant durable EID lineage-persistent RDBMS).

The new dataset onboarding engine 112 is intended to represent an interface engine that onboards the new dataset of the new dataset datastore 110 into the cross-tenant durable EID lineage-persistent RDBMS.

The EID assignment engine 114 is intended to represent a first part of integrating the new dataset into the industry-agnostic datastore 104. The EID assignment engine 114 assigns an EID to each object that was onboarded by the new dataset onboarding engine 112.

The object registration engine 116 is intended to represent a second part of integrating the new dataset into the industry-agnostic datastore 104. In a specific implementation, objects are tagged with an EID by the EID assignment engine 114 first, but it is possible some registration could occur before EID assignment.

Data may come to from multiple sources. Each source is registered by the object registration engine 116, and, in a specific implementation, all data that is ultimately loaded into a tenant will be associated with a data source. If no source is specified when creating an object, the source may have a default value. A crosswalk can represent a data provider or a non-data provider. Data providers supply attribute values for an object and the attributes are associated with the crosswalk. Non-data providers are associated with an overall entity (or relationship); it may be used to link an L1 (or L2) object with an object in another system. Crosswalks do not necessarily just apply to the entity level; each supplied attribute can be associated with data provider crosswalks. Crosswalks are analogous to the Primary Key or Unique Identifier in the RDBMS industry.

You can think of an entity as a container of crosswalks and their associated attributes and values. For example, a merged entity can be characterized as an aggregation of crosswalks from two or more entities. The additional crosswalks continue to bring their own attributes and values with them. If an acquiring (winning) entity already has the same attribute Uniform Resource Identifier (URI) that the incoming entity is bringing, then the values from the attributes will accumulate within the attribute, yet the integrity of which crosswalk each value within the attribute came from is maintained for several purposes including the need to return the attribute and its values to the original entity it came from if an unmerge is requested. If the acquiring entity does not already have the same attribute URI that the incoming entity is bringing, then the new attribute URI becomes established within the entity.

The primary EID selection engine 118 is intended to represent an engine that determines which EID to promote to primary when an object is merged with another object in the industry-agnostic datastore 104. (Presumably, at least for a short timespan, new objects that have just been assigned an EID when onboarded will treat the EID they are assigned as the primary EID until some analysis can be done to determine whether another EID should be the primary EID.) The primary EID selection engine 118 can be considered part of another engine, such as a matching engine, merging engine, and/or a survivorship engine, which will now be described. In a specific implementation, match, merge, and survivorship are intimately related.

The matching engine 120 is intended to represent an engine responsible for identifying profiles within a tenant that are considered to be semantically the same or similar. Customers can establish a match scheme using a match configuration framework and create match rules in it; identify the attributes from customer-specific entity types that can be used for matching; write a comparison formula within each match rule that is responsible for comparing one profile to another; and map token generator classes responsible for creating match candidates; to provide several possibilities by way of example. Match rules can be basic or complex and machine learning techniques can be used to match profiles.

In a specific implementation, the matching engine 120 compares and merges duplicate records to ensure data validity continuously and in real-time. When a customer creates or updates a record in the tenant, the platform cleanses and processes the record to find matches within the existing set of records. In a specific implementation, this is the platform's default behavior; cleansing and processing can also be done as a batch job.

In a specific implementation, each entity type (e.g., contact, organization, product) has its own set of match groups. Each match group holds a single rule along with other properties that dictate the behavior of the rule within that group. Comparison operators (e.g., Exact, Exact Or Null, and Fuzzy) and attributes may comprise a single rule. A set of match groups can be provided to customers based on best practices, with each having out-of-the-box (OOTB) solution accelerators; you can remove, change or supplement these groups as needed with a match rule editing engine.

In a specific implementation, the matching engine 120 uses match tokens to quickly find candidate match values. The comparison formula within a match rule is used to adjudicate a candidate match pair and will evaluate to true or false (or a score if matching is based on relevance). For example, there may be three potential outcomes of matching a pair of records: Nothing (if the comparison formula determines that there is no match), issue a directive to merge the pair, or issue a directive to queue the pair for review by a data steward.

In a specific implementation, entities and relationships have configurable attribution capability. Values found in an attribute are associated with a crosswalk held within an entity or relationship object. Each profile can have multiple crosswalks, each contributing one or more values. Profiles can be matched and merged, but relationships are also matched and merged. While you will develop match rules to govern the matching and merging of profiles, merging of relationships is automatic and intrinsic to the platform. For example, any two relationships of the same type, that each have entity A at one endpoint and entity B at their other endpoint, merge automatically.

An attribute is intrinsically multi-valued, meaning it can hold multiple values. This means any attribute can collect and store multiple values from contributing sources or through merging of additional crosswalks. Thus, if a match rule utilizes the first name attribute, then the match engine will by default, compare all values held within the first name attribute of record A to all values held within the first name attribute of record B, looking for matches among the values. You can elect to only match on operational values if desired.

In a specific implementation, a Match Groups construct is a collection of match groups with rules and operators that are needed for proper matching. For example, if you wish to enable matching for a specific entity type in your tenant, you include the Match Groups section within the definition of the entity type in the metadata configuration of your tenant. The Match Groups section will contain one or more match groups, each containing a single rule and other elements that support the rule.

In a specific JSON implementation, a customer can view a match group in a JSON editor, to see the high-level, classic elements within it. For example, the primary element can be characterized as the rule that defines a Boolean formula for evaluating the similarity of a pair of profiles given to the match group for evaluation. It is also within the rule element that four other very common elements are held: Ignore In Token (optional), Cleanse (optional), Match Token Classes (required), and Comparator Classes (required). The remaining elements that are visible (URI, label, and so on), and some not shown in the snapshot, surround the rule and provide additional declarations that affect the behavior of the group and in essence, the rule.

In a specific implementation, a match group can be designated by the customer to be one of four types: automatic, suspect, <custom>, and relevance-based. The type you select governs whether you will develop a Boolean expression for your comparison rule or an arithmetic expression. The types are described below. With automatic type, the comparison formula is Boolean and if it evaluates to TRUE, the match group will issue a directive of merge which, unless overridden through precedence, will cause the candidate pair to merge. With suspect type, the comparison formula is Boolean and if it evaluates to TRUE, the match group will issue a directive of queue for review which, unless overridden through precedence, will cause the candidate pair to appear in a "Potential Matches View" presented to a customer in a UI. Unlike the preceding rules, which are based on a Boolean construction of the rule formula, the relevance-based type expects you to define an arithmetic scoring algorithm; the range of the match score determines whether to merge records automatically or create potential matches.

A merge directive from any rule supersedes a queue for review directive from any other rule. If a Negative Rule exists in the Match Groups and it evaluates to true, any merge directives from the other rules are demoted to queue for review. Thus, in that circumstance, no automatic merges will occur.

The scope parameter of a match group defines whether the rule should be used for internal matching, external matching, or both. External matching occurs in a non-invasive manner and the results of the match job are written to an output file for you to review. Values for scope are: All (Match group is enabled for internal and external matching), None (Matching is disabled for the match group), Internal (Match group is enabled for matching records within the tenant only), and External (Match group is enabled only for matching of records from an external file to records within the tenant).

The rule element is a collection of other elements that constitute a proper match rule. The rule is the primary component within the match group. A negative rule allows you to prevent any other rule from merging records. A match group can have a rule or a negative rule. The negative rule has the same architecture as a rule, but has the special behavior that if it evaluates to true, it will demote any directive of merge coming from another match group to queue for review. To be sure, most match groups across most customers' configurations use a rule for most matching goals. But in some situations it can be advantageous to additionally dedicate one or more match groups to supporting a negative rule for the purpose of stopping a merge based on usually a single condition. And when the condition is met, the negative rule prevents any other rule from merging the records. So in practice, you might have seven match groups each of which use a rule, while the eighth group uses a negative rule.

In a specific implementation, a proactive monitoring engine (not shown) is built to detect and bypass any match rules that might degrade the performance of the matching process; it monitors match rules in tenants across all environments. In a specific implementation, after data is loaded into a tenant, the tenant configuration engine inspects every rule in the tenant over a period of time and the findings are recorded. Based on the percentage of entities failing the inspections, the proactive monitoring system detects and bypasses match rules that might cause performance issues and you will be notified. The bypassed match rules will not participate in the matching process. A customer may receive a notification when the proactive monitoring system detects a match rule that needs review. A Match Score for a profile that is designated as a potential match can assist a data steward when reviewing potential matching.

Relevance-based matching was designed primarily as a replacement of the strategy that uses automatic and suspect rule types. With relevance-based matching you can create a scoring algorithm of your own design to match records. The advantage is that in most cases, a strategy based on relevance-based matching can reduce the complexity and overall number of rules you need. The reason for this is that the two directives of merge and queue for review which normally require separate rules (automatic and suspect respectively) can often be represented by a single relevance-based rule. Using relevance-based matching you could create a match rule that contains a collection of attributes you wish to test as a group, but assign weights to those attributes to govern their relative importance in the rule.

In a specific implementation, relevance-based match rules use the match token classes in the same way as they are used in suspect and automatic match rules, but the comparison of the two entities works differently. Every comparator class provides relevance value while comparing values.

In a specific implementation, every attribute has assigned weights according to the importance of the attribute. Weights and action thresholds can be defined in a match group configuration. The weight property allows you to assign a relative weight (strength) for each attribute. For example, you may decide that Middle Name is less reliable and thus less important than First Name. The action threshold allows you to define a range of scores to drive a directive. For example, you might decide that the match group should merge the profile pair if the score is between 0.9 to 1.0, but should queue the pair for review if the score falls into a lower range of 0.6 to 0.9. You can configure a relevance-based match rule with multiple action thresholds having the same action type but with a different relevance score range.

The merging engine 122 is intended to represent an engine responsible for merging two or more profiles while aggregating crosswalks, attribute values, relationships, and interactions from contributing profiles into the winning profile. Advantageously, the matching engine 120 and the merging engine 122, along with a cleansing engine (not shown), are designed to operate in real time. Prior to the match process and merge processes occurring, every profile created or updated is also cleansed on-the-fly by a profile-level cleansing engine. For example, a 3-step sequence of cleanse, match, merge can all occur in real-time anytime a profile is created or updated. This behavior makes the cross-tenant durable EID lineage-persistent RDBMS ideal for enabling real-time operational use within a customer's ecosystem.

In a specific implementation, when two profiles merge, the resulting profile contains the aggregate of all the crosswalks of the two contributing profiles and thus the associated attributes and values from those crosswalks. The arrays behind the attributes naturally merge as well, producing for each attribute an array that holds the aggregation of all the values from the contributing attributes. Relationships benefit from the same architecture, and behave in the same manner as described for merged entities. The surviving entity ID (or relationship ID) for the merged profile (or relationship) is that of the oldest of the two contributors. Other than that, there really isn't a concept of a winner object and a loser object.

In a specific implementation, when two profiles merge the resulting profile contains references to all the interactions that were previously associated with the contributing profiles. (Note that Interactions do not reference relationships.) If profile B is unmerged from the previous merge of A and B, then B will be reinstated with its original entity ID. All of the attributes (and associated values), relationships, and interactions profile B brought into the merged profile will be removed from the merged profile and returned to profile B.

The survivorship engine 124 is intended to represent an engine responsible for creating a classic "golden record," but in the cross-tenant durable EID lineage-persistent RDBMS it is a view, materialized on-the-fly, that can be returned to an API call fetching the profile. The view contains a set of "Operational Values" (OV) from the profile, which are selected in real-time based on survivorship rules defined for the entity type.

In a specific implementation, survivorship is a process that executes in real-time when an entity is being retrieved during an Application Programming Interface (API) call. Survivorship doesn't care how crosswalks and attributes came into the consolidated profile nor the order that they arrived. It is assumed to be important to store all contributing values in the attribute for audit purposes, but, ultimately, in a specific implementation, the 'best value' or set of values for the attribute is determined so that they can be returned to users and calling applications in a request. The OV of an attribute, in the examples provided in this paper, is the "best values," or winner values of the attribute. The survivorship engine processes each attribute according to the attribute's defined survivorship rule, and produces an OV for the attribute on the fly.

Depending on the type of survivorship rule selected, there could be one or more OVs for an attribute. For example, you might choose the Aggregation rule for the address attribute for the purpose of returning all addresses a person is related to. Conversely you might choose the Frequency rule for First Name to return the one name that occurs most frequently in the First Name attribute. Note also that the role of the username making the API call also factors into the survivorship rule used. This feature allows one survivorship rule for an attribute to be stored with one username role, while another survivorship rule for the same attribute is stored with another username role. A fetch of the entity by each username role might return different OVs.

In a specific implementation, attribute value survivorship is configurable. For example, survivorship rule types can include Recency, Source System, Frequency, Aggregation, Oldest Value, Minimum Value (MinValue), Maximum Value (MaxValue), and Other Attribute Winner Crosswalk rule types. The Recency rule selects the value within an attribute that was posted most recently. You might think that the rule need only compare the Last Update Date (LUD) of the crosswalks that contribute to the attribute to find the most recently updated crosswalk, then use the value that comes from that crosswalk as the OV. But the real process is a bit more complex. In a specific implementation, there are three timestamps associated with an attribute value that play a role in determining the effective LUD for the attribute value. They are Crosswalk Update Date, Crosswalk Source Publish Date, and Single Attribute Update Date.

Crosswalk Update Date is updated at the crosswalk level and reflects the best information about when the source record was most recently updated. Crosswalk Source Publish Date is also updated at the crosswalk level but entirely under your control; it is an optional field you can write, to capture the business publish date of the data. Single Attribute Update Date is an internally managed timestamp associated with an actual value in the attribute's array of values; it is updated separately from the Crosswalk Update Date if the value experiences a partial override operation in which case it will be more recent than the crosswalk.

The Recency rule calculates the effective timestamp of an attribute value to be the most recent of the three values discussed above: Source Publish Date, Single Attribute Update Dates, LUD. Once it calculates that for each value in the attribute, it returns the most recent attribute value(s) as the OV of the attribute.

The Source System rule allows you to organize a set of sources in order of priority, as a source for the OV. Using this rule, survivorship logic will test each source in order (starting at the top of the list). If the source tested has contributed a value into the attribute, then that value will be the OV of the attribute. If it has not, then the logic will try the next source in the list. This cycle will continue until a value from a source has been found or the logic has exhausted the list. If there are multiple crosswalks from the same source, then the OV will be sourced from the most recent crosswalk.

The Frequency rule calculates the OV as the value within the attribute that is contributed by the most number of crosswalks. The Aggregation rule returns unique values held within an attribute as the OV of the attribute if an attribute has more than one value. The Oldest Value rule finds the crosswalk with the oldest create date; all values within the attribute that were provided by this crosswalk are selected as the OV, but other attributes are not affected.

The MinValue rule selects the minimum value held in the attribute. The minimum value can be defined for different data types including, by way of example, Numeric (MinValue is the smallest numeric value), Date (MinValue is the minimum timestamp value), Boolean (False is the MinValue), and String (MinValue is based on the lexicographical sort order of the strings).

The MaxValue rule selects the maximum value held in the attribute. The maximum value can be defined for different data types including, by way of example, Numeric (MaxValue is the largest numeric value), Date (MaxValue is the maximum timestamp value), Boolean (True is the MaxValue), and String (MaxValue is based on the lexicographical sort order of the strings).

The Other Attribute Winner Crosswalk rule leverages a crosswalk that was chosen by the outcome of another attribute's survivorship. For example, suppose you have a Name attribute and an Address attribute, and you feel they should be tightly coupled. And so you want to ensure that the address that is selected as the OV comes from the same crosswalk that produced the OV of the name.

In a specific implementation, you can define whether pinned/ignored or unpinned/unignored statuses (flags) should survive when two attributes with the same value but with different flags get merged. For a pinned value, survivorship rules are not applied to attribute values if one of those values is pinned. All pinned values become OVs, and all attribute's survivorship rules are just ignored. For an ignored value, the values are not participating in OV calculation, just as those attributes don't exist.

Survivorship rules define a way to govern which attribute values must be identified as the OV. Survivorship is important to defining the golden record (final state) of any object that an organization considers important. In a specific implementation, when an entity or relationship is the result of previous merges, it contains the aggregation of attributes and attribute values from the contributing objects. As a result, any attribute, whether it be a simple, nested, or reference, may contain multiple values. For example, after merging with two other entities, the first name attribute of an entity could contain three values: 'Mike', 'Mikey', and 'Michael'.

Through Advanced Search, you can search for Source System Names for which to add values to attributes for the crosswalk. In a specific implementation, from the values you specify, the system will choose the best value from these recent values. Although multiple values may be shown, you can be given the option to select a configuration to use to not calculate survivorship based on all of the system sources but to calculate survivorship only on certain sources.

Rules can be designed to work on the entire set of crosswalks that exist for the record. If you do not want all of the survivorships to be calculated based on all of the records or all of the crosswalks that exist on any records, you can set Survivorship Rules from the Sources View of any entity.

The OV can be shown next to an attribute label. In a specific implementation, the Hub can provide an indicator if additional, yet non-OV values exist. For example, the indicator could be a blue oval with a + and a number in it where the number indicates how many additional unique values are held within the attribute. In this example, clicking on the oval can navigate the user to a Sources view, where all source crosswalks and all contributed values can be seen for each attribute.

In a specific implementation, each attribute can have 0, 1, or multiple values that have been marked as OV. The OV flag is a Boolean property used to determine which attribute values must be shown to the user. The OV flag of each attribute value is calculated just-in-time when the entity's values are requested by the Hub or a calling application.

In a specific implementation, survivorship strategy is configurable for each entity type, can be changed on the fly, and can take effect immediately. This ensures that you have the agility to change the rules for calculating the OV flags at any time, and the new definition will affect the very next payload returned from the database.

Survivorship rules can be set for simple, nested, sub-nested, and referenced attributes. It may be undesirable to allow survivorship rules to be set for sub attributes of referenced attributes because survivorship rules for sub attributes are taken from the referenced entity/relation and can't be overridden on the sub attribute level. For example, if an address attribute has sub attributes such as AddressLine1, AddressLine2, and City, the survivorship rules for these sub attributes will be determined by the survivorship rules that are set for the Location entity. However, sub attributes can be used as a link in additional fields of strategy (Primary Attribute URI, Comparison Attribute URI).

In a specific implementation, you can define a dependent survivorship rule to provide precedence to certain data sources based on the value of another attribute. For example, assume a configuration where the relationship type Product To Country includes a nested attribute for Language and an attribute for Type. You can apply the survivorship rule where you can specify the source used to calculate the OV for the Product To Country Language Overview attribute based on the value of the Type relationship type attribute.

In a specific implementation, you can define the survivorship strategy for a nested attribute based conditionally on values of a sub-attribute with a Complex OV rule type. For example, you can use a "filter" property for a survivorship group mapping to be applied only for attributes that match the filter criteria. In this way, several survivorship strategies can be leveraged to treat different sub-attribute types. The resulting winners for the nested attribute are the aggregation of winners emerging from each strategy.

In a specific implementation, attribute-level survivorship is achieved. It may be noted that you can still force fields into the "golden record" even if the rules would normally exclude them as an override function. Similarly, you can exclude fields from the "golden record" even if the rules would normally include them.

Advantageously, because a tenant persists lineage of fields, it becomes possible to pick fields from different records associated with a distinct entity. For example, you can exclude inappropriate sources for regulatory purposes or shield sales from marketing using the survivorship rules to create multiple "golden records", but still use all data for internal data science. Similarly, you can spin up a new marketing group from or in addition to a sales team by setting up survivorship for the new marketing group, which can be characterized as immediate team integration. This flexibility would also facilitate cross-tenant matching by setting cross-tenant survivorship rules, if that were deemed desirable.

The cross-tenant matching engine 126 does precisely that. Thanks to the cross-tenant durable EID lineage-persistent RDBMS retaining objects at L1, which tenants inherit either directly or indirectly through an intervening layer (e.g., L2), the system is aware both objects appear to reference the same real world entity. Tenants can use different EIDs to reference the object, at least a portion of the object for which they are permitted access. In this way, objects for which a user who has access to the cross-tenant durable EID lineage-persistent RDBMS and appropriate permissions can be match objects across tenants using whatever EID the user has, regardless of whether it is the primary EID and regardless of whether a first EID used by a first client is the same as a second EID used by a second client for the same object.

The lineage EID promotion engine 128 is intended to represent an engine that promotes a legacy EID to primary in an object of the industry-agnostic datastore 104. The lineage EID promotion engine 128 may act in concert with an unmerging engine (not shown) to recreate a first object as it existed prior to merging with a second object to create a third object. Advantageously, lineage EID promotion can occur in real time, without taking down a database, and, due to the persistent lineage of each element of the object, it would make no difference if the third object were modified after the merger to create a fourth, fifth, or nth object, prior to being unmerged. If the first or second objects lacked an EID persistent lineage, unmerging the objects would be a labor-intensive endeavor that would be, for all practical purposes, impossible in a big data context for an actively-used database.

Figure 2:
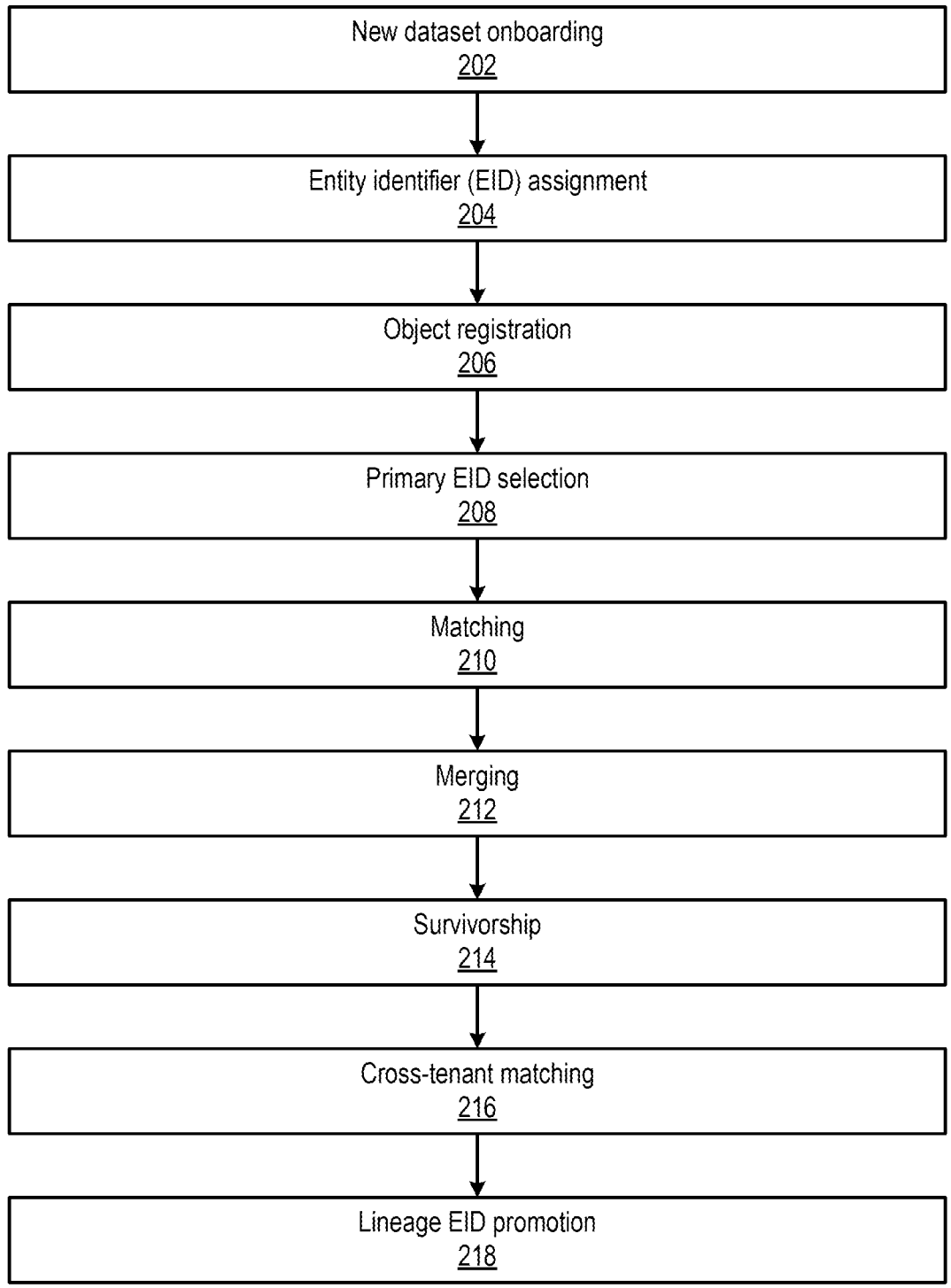
FIG. 2 is a flowchart of an example of a method of cross-tenant matching and lineage EID promotion.

FIG. 2 is a flowchart 200 of an example of a method of cross-tenant matching and lineage EID promotion. The flowchart 200 starts at module 202 with new dataset onboarding. New dataset onboarding is described above with reference to the new dataset onboarding engine 112, which can carry out the process.

The flowchart 200 continues to module 204 with EID assignment. EID assignment is described above with reference to the EID assignment engine 114, which can carry out the process.

The flowchart 200 continues to module 206 with object registration. Object registration is described above with reference to the object registration engine 116, which can carry out the process.

The flowchart 200 continues to module 208 with primary EID selection. Primary EID selection would occur naturally for a new object that has only one EID, but for objects that are merged, a primary EID is selected for it as described above with reference to the primary EID selection engine 118, which can carry out the process.

The flowchart 200 continues to module 210 with matching. Matching refers to the matching of objects in a datastore, such as the industry-agnostic datastore 104, the optional industry-focused datastore 106, and/or one or more of the tenant datastores 108. Because of a continuous process of integrating objects into the datastore(s), at some point an attempt at matching is likely to be made for every object that is onboarded, which may or may not result in a match. This is described above with reference to the matching engine 120, which can carry out the process.

The flowchart 200 continues to module 212 with merging. Merging refers to finding two objects that represent a common real world entity. This is described above with reference to the merging engine 122, which can carry out the process. Not all objects that are onboarded will necessarily be merged with other objects. Accordingly, the module 212 could be skipped.

The flowchart 200 continues to module 214 with survivorship. Survivorship refers to, among other things, the technique of persisting EIDs. This is described above with reference to the survivorship engine 124, which can carry out the process. Not all objects that are onboarded will necessarily be merged, thereby triggering the survivorship, so the module 214 could be skipped.

The flowchart 200 continues to module 216 with cross-tenant matching. Cross-tenant matching refers to the ability of a first tenant to use a first EID (or agent of the cross-tenant durable EID lineage-persistent RDBMS or other party that is given access) to match an object with a second EID at a second tenant. As mentioned above with reference to the cross-tenant matching engine 126, which can carry out the process, this functionality is made possible by, in part, recognizing objects in two different tenants are associated with the same real world entity. It is not necessary for there to be actual cross-tenant matching for the flowchart 200 to continue to module 218.

The flowchart 200 ends at module 218 with lineage EID promotion. As mentioned above with reference to the lineage EID promotion engine 128, which can carry out the process, this functionality is made possible, in part, by persisting lineage EIDs and enables unmerging of objects in real time, without taking a datastore of the cross-tenant durable EID lineage-persistent RDBMS offline, at which point the flowchart 200 can resume at one of several of the modules 202-218.

What is claimed is:

1. A system comprising:
    an entity identifier (EID) assignment engine;
    a primary EID selection engine coupled to the EID assignment engine;
    a survivorship engine coupled to the primary EID selection engine;
    a lineage EID promotion engine coupled to the survivorship engine;
    wherein, in operation:
        the EID assignment engine assigns an EID to a first object stored in a datastore of a multitenant EID lineage-persistent relational database management system (RDBMS), wherein the datastore has an n-tier architecture, wherein the datastore includes an industry-agnostic datastore in a Layer 1 (L1) datastore of the n-tier architecture, wherein the datastore includes an industry-focused datastore in a Layer 2 (L2) datastore of the n-tier architecture, wherein the datastore includes a tenant datastore in Layer (L3) datastores of the n-tier architecture, and wherein L3 inherits objects from L2;
        the primary EID selection engine, for a first set of EIDs that reference a common real world entity with which the first object is associated, selects a primary EID from a first set of EIDs of the first object;
        the survivorship engine, when the first object is merged with a second object to produce a third object, maintains the first set of EIDs as a first set of persistent lineage EIDs in association with first attributes of the first object, maintains a second set of EIDs as a second set of persistent lineage EIDs in association with second attributes of the second object, and maintains the first set of persistent lineage EIDs and the second set of persistent lineage EIDs in association with the third object;
        the lineage EID promotion engine, when the first object is unmerged from the second object, the third object, or a fourth object that is a child or grandchild of the third object, selects a lineage EID of the first set of persistent lineage EIDs to serve as a primary EID of the now-unmerged first object;
        wherein a first tenant object is stored in a first tenant datastore of the L3 datastores and a second tenant object is stored in a second tenant datastore of the L3 datastores, comprising a cross-tenant matching engine that matches the first tenant object with the second tenant object.

2. The system of claim 1, comprising a new dataset onboarding engine that receives a new dataset including an object that is assigned an EID by the EID assignment engine.

3. The system of claim 1, comprising an object registration engine that registers an object in association with a source of the object.

4. The system of claim 1, comprising a matching engine that identifies within a tenant a first profile of the first object and a second profile of the second object that are semantically the same or similar.

5. The system of claim 1, comprising a merging engine that merges the first object and the second object while aggregating crosswalks, attribute values, relationships, and interactions from contributing profiles of the first object and the second object into a winning profile.

6. A method comprising:
    assigning an entity identifier (EID) to a first object stored in a datastore of a multitenant EID lineage-persistent relational database management system (RDBMS), wherein the datastore has an n-tier architecture, wherein the datastore includes an industry-agnostic datastore in a Layer 1 (L1) datastore of the n-tier architecture, wherein the datastore includes an industry-focused datastore in a Layer 2 (L2) datastore of the n-tier architecture, wherein the datastore includes tenant datastore in Layer (L3) datastores of the n-tier architecture, and wherein L3 inherits objects from L2;
    for a first set of EIDs that reference a common real world entity with which the first object is associated, selecting a primary EID from a first set of EIDs of the first object;
    when the first object is merged with a second object to produce a third object, maintaining the first set of EIDs as a first set of persistent lineage EIDs in association with first attributes of the first object, maintaining a second set of EIDs as a second set of persistent lineage EIDs in association with second attributes of the second object, and maintaining the first set of persistent lineage EIDs and the second set of persistent lineage EIDs in association with the third object;
    when the first object is unmerged from the second object, the third object, or a fourth object that is a child or grandchild of the third object, selecting a lineage EID of the first set of persistent lineage EIDs to serve as a primary EID of the now-unmerged first object, wherein a first tenant object is stored in a first tenant datastore of the L3 datastores and a second tenant object is stored in a second tenant datastore of the L3 datastores, comprising a cross-tenant matching engine that matches the first tenant object with the second tenant object.

7. The method of claim 6, comprising receiving a new dataset including an object that is assigned an EID.

8. The method of claim 6, comprising registering an object in association with a source of the object.

9. The method of claim 6, comprising identifying within a tenant a first profile of the first object and a second profile of the second object that are semantically the same or similar.

10. The method of claim 6, comprising merging the first object and the second object while aggregating crosswalks, attribute values, relationships, and interactions from contributing profiles of the first object and the second object into a winning profile.

\* \* \* \* \*